United States Patent Office 2,971,966
Patented Feb. 14, 1961

2,971,966

PROCESS OF PREPARING VITAMIN A ESTERS

William E. Stieg, Mystic, and Axel T. Nielsen, Old Mystic, Conn., assignors to Chas. Pfizer & Co., Inc., Brooklyn, N.Y., a corporation of Delaware No Drawing. Filed Aug. 30, 1957, Ser. No. 681,182

10 Claims. (Cl. 260—410)

This invention is concerned with a process for preparing higher fatty acid esters of vitamin A, and with certain novel compositions containing said esters.

Esters of vitamin A, that is, esters of vitamin A alcohol with alkanoic or alkenoic acids having from about ten up to about twenty-two carbon atoms in the chain, are especially useful forms of the vitamin. Particularly the longer chain compounds have high solubility in fats, are excellently stable on storage, and are readily incorporated in various pharmaceuticals, human foods, or animal foods. For these reasons they are preferred to vitamin A alcohols for therapeutic and other commercial use.

In one method for the manufacture of synthetic vitamin A, the acetate, or if preferred, another lower alkanoic acid ester, is obtained as an end product. This type of compound has been converted to the desirable long-chain fatty acid esters by saponification and re-esterification, for example, with a long-chain fatty acid chloride. Such a process has a number of deficiencies. The extra steps of saponification and isolation of the vitamin A alcohol are wasteful, involving decomposition and losses due to oxidation of the vitamin. The use of the long-chain fatty acid chlorides is unsatisfactory, since they are highly corrosive compounds and are unstable, readily hydrolyzing in the presence of moisture with the evolution of hydrogen chloride. A process which would avoid these and other difficulties of known procedures would be of considerable value.

This invention at last provides such a process. This application is a continuation-in-part of Serial No. 443,970, filed July 16, 1954, and now abandoned, which application was in turn based on application, Serial No. 269,578, filed on February 1, 1952, by William E. Stieg et al., now U.S. Patent 2,693,435. Broadly speaking, the present novel method involves transesterifying relatively simple vitamin A esters with longer chain aliphatic non-vitamin esters. The transesterification is achieved by contacting a lower alkanoic acid ester of the vitamin with an aliphatic ester of a longer chain alkanoic or alkenoic acid in the presence of an alkaline catalyst, preferably under substantially anhydrous conditions. More complex mono-esters of fatty acids and the like are thus obtained, and by a process which is much more direct and simpler than the conventional method.

In one preferred embodiment of this invention, a lower alkanoic acid ester of vitamin A, e.g. one where the acid chain contains say between two and six carbon atoms, is reacted with a lower ester of an aliphatic hydrocarbon carboxylic acid having from about ten to twenty-two carbon atoms with which it is desired to form a new vitamin A ester. These longer-chain esters generally are first formed from the lower one to four or five carbon monohydric aliphatic alcohols and the higher monobasic alkanoic or alkenoic acid. The reaction is conducted at a mildly elevated temperature to accelerate the process, under substantially anhydrous conditions to minimize undesirable side reactions, and in the presence of an alkaline transesterification catalyst, particularly an alkali metal or alkaline earth metal compound. The desired vitamin A-fatty acid ester is recovered as the product, and the corresponding lower aliphatic alcohol-lower alkanoic acid ester is obtained as the principal by-product.

By heating to a suitable temperature or by lowering the pressure or by both practices, the lowest boiling component of the reaction mass (e.g. the by-product ester of the lower alcohol) is distilled out of the mixture, preferably as it is formed, thus assisting in completing the desired reaction. The elevation of temperature of the mixture also assists in forming a completely liquefied system which is homogeneous and more readily stirred. Some of the lower aliphatic alcohol esters of the long-chain aliphatic acids are solid at room temperature. A range of temperature from about 20° C. to about 80° C. is most suitable for the reaction. Removal of the by-product ester has a very distinct advantage in resulting in the formation of vitamin A esters of very high purity. In fact, these materials are often of such high purity that they readily crystallize. In any event the purity of the resulting ester is invariably in excess of 80%, and generally of 95–100%. They also have other advantages due to their high purity, such as a very low level of taste and the absence of deleterious degradation products and by-products. This process has proven exceedingly useful for the preparation, on a large scale, of vitamin A esters of very high purity, and with the minimum of loss due to decomposition. The product thus produced is free of impurities which result from the previously used process of saponification and direct esterification. Furthermore, the danger of corrosive esterification agents is completely eliminated by the present process.

It has been found most important, in order to achieve transesterification at practical rates, to have present in the reaction mixture an alkaline catalyst, preferably an alkali metal or alkaline earth metal compound or the alkali metal itself. The compound chosen is desirably in the form of an alkoxide, oxide, or hydroxide, for example sodium hydroxide, potassium hydroxide, lithium hydroxide, barium hydroxide, calcium hydroxide, calcium oxide, barium oxide, sodium methoxide, lithium methoxide, potassium ethoxide, barium methoxide, calcium methoxide, magnesium isopropoxide and so forth. Of the alkali metals, a particularly useful catalyst is an alloy of sodium and potassium containing from 50% to 15% sodium and from 50% to 85% potassium which is liquid below 50° C. A 50–50 sodium potassium alloy is particularly suitable. The catalyst need only be used in a low proportion, e.g. 0.20 mole per mole of vitamin A reactant or less; and substantially between 0.01 and 0.1 mole per mole of the vitamin ester is generally enough. It is important that good contact of the catalyst and reactants be obtained, and efficient mechanical agitation is normally maintained for this purpose. The catalyst may be added as solution or suspension in a suitable solvent such as a lower alcohol. This assists in improving distribution of the catalyst throughout the reaction mass. If a solvent it utilized for the addition of the catalyst, this, too, is removed during the distillation of the ester by-product.

Approximately equimolecular proportions of the long-chain fatty acid ester and the shorter chain vitamin A ester starting materials are sufficient for the usual reaction. An excess of one or the other constituent can readily be present without harm, however, although little value results therefrom. Either or both reactants may be in crude or purified form, depending on the product desired. A notably useful simple vitamin A ester is the acetate, which is most readily available in commerce. However, vitamin A propionate, butyrate, isobutyrate, valerate, etc. can also be transesterified by this new process. Valuable reactants among the longer chain fatty acid esters are the palmitates, laurates, myristates, stearates, esters of unsaturated fatty acids of either cis or trans configuration, such as oleates, linoleates, elaidates, erucates, brassidates, undecylenates, and the like, esterified with monohydric aliphatic alcohols, e.g., methanol, ethanol, methoxy ethanol, ethoxy ethanol, allyl alcohol, propanols, butanols, etc.

In carrying out the process of this invention, the long-chain ester is generally heated in a suitable vessel and, in the case of those esters, which are solids, first melted. The vitamin A lower alkanoic acid ester, e. g. the acetate, which also may be solid in purified form, is mixed with the other reactant and the catalytic metallic compound is introduced. The mixture is stirred well. It is preferable to dry the reactants before addition of the catalyst, so that the desirable anhydrous condition is maintained. Good agitation is necessary to assure sufficient contact of the catalyst and reactants, particularly since certain of the catalysts may have low solubility in the reaction mixtures. The temperature is gradually elevated. Vacuum may be applied to the warm mixture, so that the ester formed from the lower aliphatic alcohol and lower alkanoic acid is distilled off and completion of the reaction accelerated. In fact application of vacuum is preferable where the ester by-product is high-boiling. This by-product can be collected, and when approximately an equimolar proportion thereof has been obtained, the reaction is considered complete. If a vacuum is used for the removal of the ester, some losses may occur in the vacuum system unless an efficient trap is utilized. However, experience with the process will indicate how long any particular esterification takes to complete and the volume of by-product ester collected need no longer be used as an index of completion of the reaction. Transesterification may take from one hour to several hours, depending somewhat on the temperature, the catalyst, and the equipment used. In general it is best to heat the reaction mixture above about 20° C. but not much above 80° C. Little or no destruction of the active compound occurs even at 80° C. or somewhat more, and high yields of vitamin A long-chain fatty acid esters are still obtained. Although a high boiling organic solvent like an aromatic hydrocarbon (which must, of course, have a boiling point higher than the by-product ester to be distilled out of the reaction mixture) may be used, this is not the preferred procedure, since it is not essential for high yields and it may increase the difficulty of recovering the compound.

After the reaction has been substantially completed, the product may be dissolved in a suitable solvent, that is, one capable of dissolving the vitamin A-long-chain fatty acid ester but yet of a fairly low boiling point for ease of subsequent removal. Examples of useful solvents are benzene, petroleum ether, chloroform, diethyl ether, methylene dichloride, and so forth. The catalyst may then be removed by washing the organic solvent solution with water or with a dilute acid in just sufficient amount to neutralize the alkaline compound. Various weak acids are particularly effective for this purpose. In fact, a solution of carbon dioxide in water is quite satisfactory. Weak organic acids such as acetic acid may also be used. The organic solution may then be dried and the solvent removed to yield the desired long-chain fatty acid ester of vitamin A. It is obvious that toxic material should not be left in the final reaction mixture or product, if the compound is intended for use in nutrition or in therapy.

The products prepared by the present process, that is, long chain aliphatic acid esters of vitamin A of high purity possess considerable stability due to the absence of deleterious by-products. However, for certain uses it is advisable to add to the vitamin certain antioxidants. A substantial number of such stabilizing agents have been tested with little or no success, but it has been found that alkylated phenolic or alkylated polyhydric phenolic food-grade antioxidants are surprisingly useful for this purpose. An unexpectedly high degree of stabilization is obtained by the addition of sufficient of these materials, generally less than about 3%, to the products of this invention. The most suitable proportion of a given agent for a specific composition may be determined with the minimum of testing, using well-known methods of evaluation. In general, the most favorable proportion ranges from about 0.2% to 2.0% by weight based on the vitamin A alcohol content of the product, but certain materials may require more or less than this. Stable vitamin A compositions of high potency are thus provided. Such compositions containing a major proportion, 80% or more, of a vitamin A ester and up to about 2–3% of these antioxidants are especially useful and convenient for bulk use of vitamin A in the food and drug industries.

The alkyl group of the chosen alkylated phenolic or polyhydric phenolic food-grade antioxidant has preferably at least about three carbon atoms and not more than about six, and the tertiary butyl group is particularly useful for this purpose. When a polyhydric phenol derivative, such as a compound related to catechol or hydroquinone, is used, it may take the form of a mono-lower alkyl ether. Among the most useful stabilizing agents for the new compositions of this invention are butylated hydroxyanisoles, 3-tertiary butyl-4-hydroxyanisole, 2-tertiary butyl-4-hydroxyanisole, 2,6-di-tertiary butyl-4-methyl phenol, 2,2'-methylenebis-(4-methyl-6-tertiary butyl phenol), tertiary butyl meta-cresol, 2,5-di-tertiary butyl hydroquinone, structurally related compounds and mixtures of these. It is, of course, necessary to use stabilizers of low toxicity for pharmaceutical preparations. The stabilizer may be added to the novel oil-vitamin A compositions after removal of the alkaline catalyst.

It should be noted that not only may a single long-chain aliphatic acid-short-chain aliphatic alcohol ester be utilized as one of the starting materials in the present process, but mixtures of such esters, such as mixtures of methyl palmitate and ethyl oleate, may also be used. Such mixtures have certain advantages in that the mixtures of long-chain aliphatic acid esters of vitamin A ordinarily are liquid at room temperature, whereas the esters with a single acid being of high purity often tend to crystallize at room temperature. It is obvious that there are some advantages to liquid vitamin A ester mixtures of high purity, since liquids may more readily be added to mixed products and may be measured out by volume more conveniently.

The following examples are given by way of illustration and are not to be construed as the sole embodiment of this invention. It is to be understood that protection hereof is only to be limited by the specific wording of the appended claims.

*Example 1*

One-third of a mole (109.5 g.) of pure crystalline vitamin A acetate was mixed with one-third of a mole (90.2 g.) of methyl palmitate. The mixture was placed in a 500 ml. round-bottomed flask equipped with a capillary tube for introducing a fine stream of nitrogen gas and an outlet above the surface of the liquid connected through a Dry Ice-cooled trap to a high vacuum pump. The mixture was heated in this flask at a temperature of 45–55° C. to melt the solid material. The melt was subjected to high vacuum for an hour to remove traces of ethanol and water, and then 4.0 g. of dry sodium methylate was added. The flask was again evacuated and the mixture was heated at 55°–60° C. for about two hours. During this period over 90% of the theoretical amount of methyl acetate by-product was collected in the Dry Ice-cooled trap. The reaction was continued for another hour and the weight of the residue in the flask was then checked. It was found that between 98 and 100% of the theoretical loss in weight due to distillation of methyl acetate had occurred. The residual product consisted of practically pure vitamin A palmitate containing the catalytic metallic alkoxide. This palmitate was freed of the sodium methylate by dissolving in 2 to 4 volumes of methylene chloride and washing the solvent solution with water. When the water washings were found to be neutral, the solvent was removed by evaporation in vacuo at 40°–50° C. The final vitamin A palmitate product weighed 169 g. and was shown to assay 98–100% pure by the U.S.P. XIV spectrophotometric method. Its refractive index was $n_D^{20}=1.555-1.556$, and the saponification equivalent was found to be 520–530.

*Example II*

One-third of a mole (109.5 grams) of pure crystalline vitamin A acetate was mixed with one-third of a mole (90.2 grams) of pure methyl palmitate in apparatus as described in the example above. The mixture was heated under vacuum as before for removal of traces of ethanol and water. Then 0.35 gram of lithium methoxide dissolved in 10 ml. of methanol was added. The methyl acetate was distilled from the reaction mixture at 55°–60° C. over a period of 90 minutes. There was a loss of 24.5 grams, which showed 100% reaction. The residue was dissolved in three volumes of methylene chloride, treated with water saturated with carbon dioxide, and then washed three times with water. After drying the organic solvent solution over anhydrous sodium sulfate, the solvent was removed under vacuum. One hundred seventy grams of vitamin A palmitate assaying 99% pure were obtained.

*Example III*

Vitamin A acetate and methyl palmitate were reacted by the procedure of Examples I and II with the exception that magnesium ethoxide was used to catalyze the ester interchange. The vitamin A palmitate produced was of approximately the same purity and was obtained in similar high yield.

*Example IV*

One-third of a mole (109.5 grams) of pure vitamin A acetate was mixed with one-third of a mole (94.8 grams) of pure ethyl palmitate. The reaction was carried out as before, using a catalyst consisting of 0.2 gram of sodium metal dissolved in 10 mls. of anhydrous ethanol. Approximately two hours were required to complete the removal of the ethyl acetate by-product. After working up the residue as in the previous examples, a 170-gram yield of vitamin A palmitate assaying from 99–100% pure was obtained.

*Example V*

Equimolecular proportions of vitamin A acetate and methyl palmitate were commingled and the mixture melted at 45°–50° C. in a reaction chamber equipped with a stirrer, a thermometer, a connection to a Dry Ice-cooled trap attached to a vacuum pump, and a dropping funnel for introduction of the catalyst. The melted mixture was stripped for two hours under high vacuum to remove volatile material, such as water. A solution of sodium methylate in methanol, having a concentration of 25 grams per 100 mls. was used as a catalyst. The course of the transesterification was followed by observing the rate of distillation of the methyl acetate and the loss of weight in the reaction products. The following table records the observations made.

| Time (Minutes) | Weight of Sodium Methylate Used | Temperature (° C.) | Weight of Methyl Acetate Collected, grams | Percent of Calculated Loss in Weight of Reaction Mixture |
|---|---|---|---|---|
| 0 | 10.0 | 46 | | |
| 10 | | 35 | 261 | 71 |
| 20 | | 50 | | |
| 45 | | 55 | 347.5 | 94 |
| 50 | 11.3 | 55 | | |
| 75 | | 55 | 355.5 | 96 |
| 135 | | 55 | | 98 |

The reaction vessel was found to have lost 98% of the weight calculated to be lost by complete distillation of methyl acetate by-product. Thus, the reaction was 98% complete. The residual product was dissolved in three volumes of hexane, washed once with water containing carbon dioxide, and washed three times with pure water. The hexane solution was then concentrated under vacuum and the vitamin A palmitate product recovered. The weight of this showed a yield of 96%. The new ester assayed 100% as vitamin A palmitate by the U.S.P. XIV assay method.

*Example VI*

One mole of pure crystalline vitamin A acetate (328 grams) and one mole of methyl palmitate (270 grams) were melted together in a chamber similar to that described in Example V. To this mixture was added a solution of 4.5 grams of magnesium metal in 100 mls. of warm methanol. The reaction mixture was heated to 55° C. and this catalyst was added with stirring. The reaction vessel was evacuated and the mixture of methanol and methyl acetate was immersed in a Dry Ice bath. The reaction was discontinued after two hours and it was found that the reaction mixture had lost 71 grams of weight (corrected for the weight of catalyst used). The methyl acetate-methanol mixture collected in the trap was found to contain 71.5 grams of methyl acetate. Thus, the reaction was 95–96% complete. The product was dissolved in three volumes of hexane and, after washing with water containing carbon dioxide, it was washed twice with pure water. The hexane was then removed under vacuum. The residue, light-colored vitamin A palmitate, weighed 520 grams and assayed 98%.

*Example VII*

One-third of a mole of pure crystalline vitamin A acetate was mixed with one-third of a mole of methyl laurate. After removing volatile materials, such as water, by gentle heating under vacuum, a solution of sodium methylate in methanol (three molar percent) was added. The mixture was stirred and heated as described in Example VI. After the reaction had been completed, the product was recovered and purified as before. The recovered vitamin A laurate assayed 100% and had a refractive index of $n_D^{20}=1.5693$.

*Example VIII*

A mixture of 0.75 mole of vitamin A acetate and 0.75 mole of ethyl myristate was treated with a small amount (about 0.05 mole) of sodium methylate. The mixture was stirred and heated to a temperature of 45°–55° C. The ethyl acetate by-product was distilled out under vacuum as in the previous examples. After recovery, the vitamin A myristate was found to assay 99.5% pure. It had a refractive index of $n_D^{20}=1.5632$ and readily crystallized on standing in a refrigerator.

*Example IX*

Equimolecular proportions of vitamin A butyrate and propyl laurate were mixed and about 0.1 mole of lithium hydroxide dissolved in a small volume of methanol was added. The mixture was heated at 50° C. under vacuum for several hours. The propyl butyrate which distilled from the reaction mixture was collected in a Dry Ice-cooled trap. When approximately one molecular proportion had been collected, the reaction mixture was cooled, dissolved in a solvent and washed with water containing carbon dioxide to remove the alkaline catalyst. An almost quantitative yield of vitamin A laurate was obtained. The product was mixed with 0.5% of commercial butylated hydroxyanisole and it was then dried under vacuum using a stream of dry nitrogen.

Example X

One mole, 328 g. of vitamin A acetate and 296.5 g. (1 mole) of methyl oleate were melted together in a 3 l. round-bottomed flask equipped with a capillary inlet tube for the introduction of nitrogen gas and an outlet above the surface of the liquid connected through a cold trap (solid carbon dioxide) to a high vacuum pump. The mixture was thoroughly dried by subjecting to a high vacuum at a temperature of 45–50° C. for one hour. A solution of 7 g. of barium oxide in 70 ml. of methanol was then added and the methanol and by-product methyl acetate distilled in vacuo in the preceding fashion. The reaction was complete within two hours. The catalyst was then neutralized by washing first with water saturated with carbon dioxide, followed by pure water until successive water washes had neutral pH's. The organic layer was then collected and thoroughly dried in vacuo providing vitamin A oleate, 545 g. assaying 95.4% pure according to the U.S.P. XIV assay, refractive index $n_D^{20}$=1.5484. The product was mixed with 1.0% of commercial butylated hydroxytoluene.

Example XI

One third of a mole each of vitamin A isobutyrate and methyl palmitate were mixed with 10 ml. of a 25% solution of sodium hydroxide in methanol. The mixture was stirred under vacuum and heated to a temperature of 60–70° C. for one hour at which time the reaction mixture exhibited a refractive index of $N_D^{20}$=1.5372. A second 10 ml. portion of catalyst was added and the mixture once again heated under vacuum to a temperature of 65–70° C. for one hour ($N_D^{20}$=1.5448). A 5 ml. portion of catalyst was added and the reaction continued for an hour ($N_D^{20}$=1.5460). The product was recovered by neutralization of the catalyst, washing and drying in the usual fashion. A yield of 79% of vitamin A palmitate was obtained which assayed 1,490,000 U.S.P. units per gram.

Example XII

Isopropyl palmitate (280 grams) and vitamin A acetate (307 grams) were mixed with 30 ml. of 20% sodium hydroxide in methanol. The mixture was stirred under vacuum and heated to a temperature of 60–70° C. for four hours. Thereafter, 40 ml. of the catalyst solution was added in four portions every 30 minutes. After a total of 6 hrs., the reaction mixture was cooled and the vitamin A palmitate was recovered in the fashion described in the preceding examples, $N_D^{20}$=1.5470.

Example XIII

The process of Example X is repeated substituting 4.8 g. of calcium hydroxide for the barium hydroxide specified with the recovery of vitamin A oleate as described.

Example XIV

The process of Example X is repeated substituting 201 g. of methyl hendec-10-enate for the methyl oleate specified with the recovery of vitamin A hendec-10-enate.

Example XV

The process of Example I is repeated substituting one-third of a mole of vitamin A valerate for the vitamin A acetate employed. A somewhat higher temperature, approximately 75–80°, is employed after the addition of the catalyst, due to the higher boiling point of the by-product methyl valerate. Vitamin A palmitate in excess of 80% purity is obtained.

Example XVI

The process of Example I is repeated substituting one-third of a mole of allyl palmitate for the methyl palmitate employed in that process. Vitamin A palmitate is recovered in a similar fashion although a somewhat longer time is required for the calculated quantity of allyl acetate to distill.

Example XVII

The process of Example I is repeated substituting methyl arachidate and vitamin A caproate for the reactants specified. The methyl caproate is distilled from the reaction mixture in vacuo and the vitamin A arachidate recovered in the usual fashion.

Example XVIII

Crystalline vitamin A acetate, 0.33 mole, and methyl palmitate, 0.33 mole, are mixed and 1 ml. of sodium potassium alloy (50–50) is added. The mixture is heated at about 50° C. in vacuo and the by-product methyl acetate distilled. The catalyst is neutralized and the product recovered as described in Example I. A yield of 172 g. (97%) of vitamin A palmitate assaying 97% pure is obtained, $n_D^{20}$=1.5563.

What is claimed is:
1. A transesterification process which comprises contacting, in the presence of an alkaline catalyst, an ester of vitamin A and a monobasic alkanoic acid having from about two to about six carbon atoms with a lower monohydric aliphatic alcohol ester of an acid selected from the group consisting of monobasic alkanoic and alkenoic acids having from about ten to about twenty-two carbon atoms and removing the by-product ester of the lower alkanoic acid.
2. A process as claimed in claim 1 wherein the ester reactants are heated at a temperature between about 20° C. and about 80° C.
3. A process as claimed in claim 2 wherein the by-product ester is removed under vacuum.
4. A process as claimed in claim 1 wherein the catalyst is chosen from the group consisting of an alkali metal alkoxide, an alkaline earth metal alkoxide, an alkali metal hydroxide, an alkaline earth metal hydroxide, an alkaline earth metal oxide and an alkali metal.
5. A process as claimed in claim 1 wherein the catalyst is an alkali metal alkoxide.
6. A process as claimed in claim 1 wherein the catalyst is an alkaline earth metal alkoxide.
7. A process as claimed in claim 1 wherein the catalyst is an alkali metal hydroxide.
8. A process as claimed in claim 1 wherein the catalyst is a 50–50 alloy of sodium and potassium.
9. A transesterification process which comprises melting together, under relatively anhydrous conditions, approximately one molecular proportion of an ester of vitamin A with a lower monobasic alkanoic acid having from about two to about six carbon atoms, about one molecular proportion of a lower monohydric aliphatic alcohol ester of a monobasic acid selected from the group consisting of the alkanoic and alkenoic acids having from about ten to about twent-two carbon atoms and between about 0.01 and 0.2 molecular proportions of an alkaline catalyst, removing the volatile ester by-product by distillation and recovering the longer chain aliphatic ester of vitamin A thereby produced.

10. The method for preparing vitamin A palmitate which comprises interesterifying vitamin A acetate with methyl palmitate in the presence of a catalytic amount of sodium methoxide.

References Cited in the file of this patent

UNITED STATES PATENTS

| | | |
|---|---|---|
| 2,169,195 | Hickman et al. | Aug. 8, 1939 |
| 2,229,173 | Hickman | Jan. 21, 1941 |
| 2,394,456 | Korner et al. | Feb. 5, 1946 |
| 2,651,644 | Ole Gisvold | Sept. 8, 1953 |
| 2,686,751 | Embree et al. | Aug. 17, 1954 |
| 2,728,784 | Bell et al. | Dec. 27, 1955 |